July 6, 1926.

W. E. VER PLANCK ET AL 1,591,447

COMPRESSOR STRUCTURE

Filed April 18, 1924   2 Sheets-Sheet 1.

Inventors:
William E. Ver Planck,
Duncan Dana,
by *Alexander D. Lunt*
Their Attorney.

July 6, 1926.

1,591,447

W. E. VER PLANCK ET AL

COMPRESSOR STRUCTURE

Filed April 18, 1924　　2 Sheets-Sheet 2

Inventors:
William E. Ver Planck,
Duncan Dana,
by
Their Attorney.

Patented July 6, 1926.

1,591,447

UNITED STATES PATENT OFFICE.

WILLIAM EVERETT VER PLANCK, OF SALEM, AND DUNCAN DANA, OF MARBLEHEAD, MASSACHUSETTS, ASSIGNORS TO GENERAL ELECTRIC COMPANY, A CORPORATION OF NEW YORK.

COMPRESSOR STRUCTURE.

Application filed April 18, 1924. Serial No. 707,513.

The present invention relates to centrifugal compressors such as are used for handling gas and especially to compressors of considerable capacity.

The object of the invention is to provide an improved compressor structure which is compact, and which can be manufactured at a low cost, and for a consideration of what we believe to be novel and our invention, attention is directed to the accompanying description and the claims appended thereto.

Figure 1:
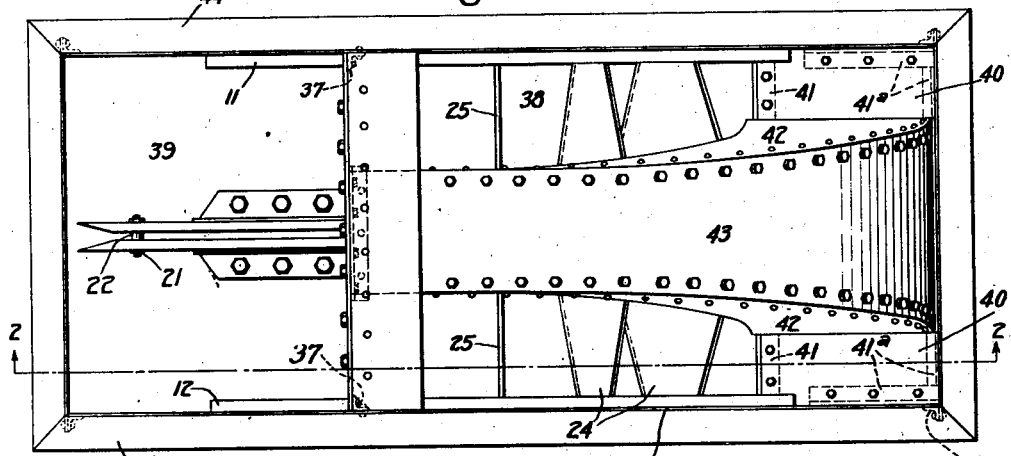
Figure 2:
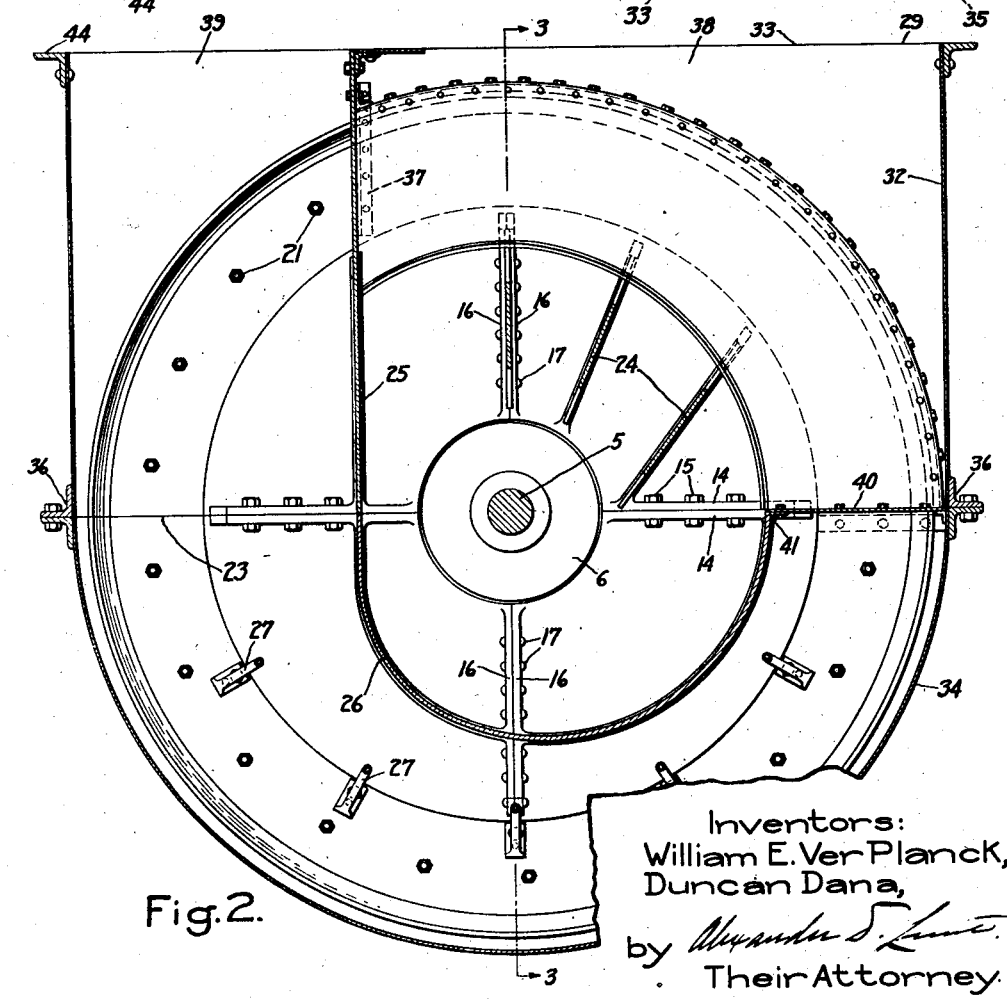
Figure 3:
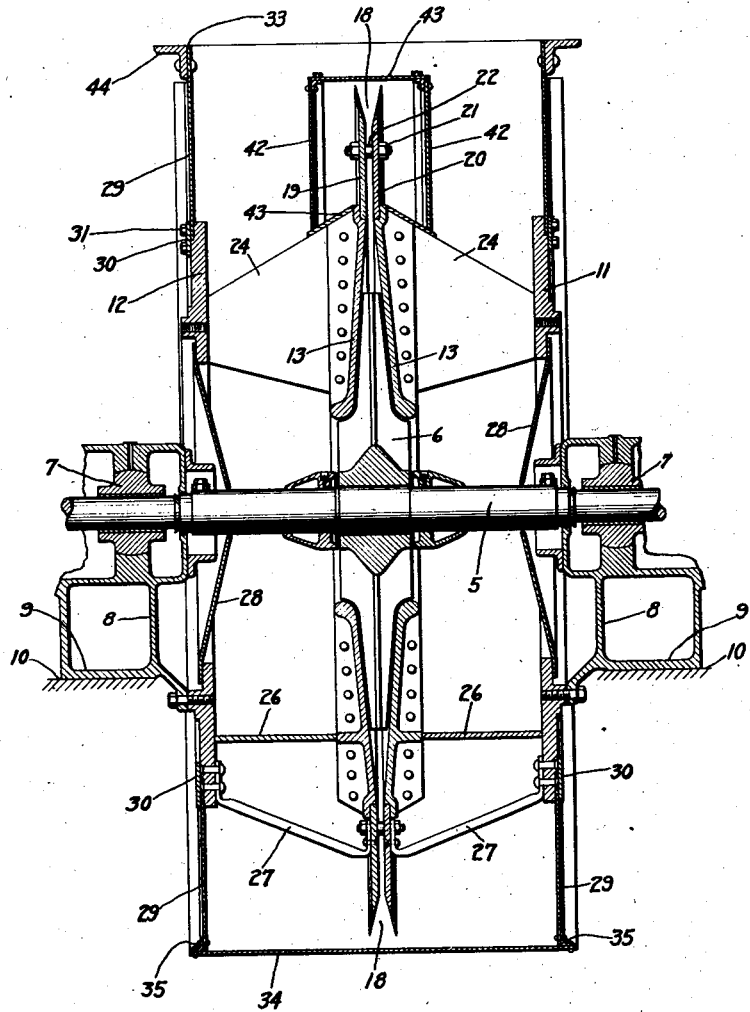

In the drawing, Fig. 1 is a top plan view of a compressor embodying the invention; Fig. 2 is a sectional view taken on line 2—2, Fig. 1; and Fig. 3 is a sectional view taken on line 3—3, Fig. 2.

Referring to the drawing, 5 indicates the compressor shaft on which is mounted the impeller 6 which may be of any suitable structure. The shaft is supported in bearings 7 which are attached to the sides of the compressor casing by bearing brackets 8. At 9 are supporting feet for the compressor which rest on suitable foundations 10.

The compressor casing comprises two annular side rings 11 and 12 which are made of fairly heavy material and are the parts to which bearing brackets 8 are attached. At 13 are annular stationary side plates for impeller 6. They may be constructed in any suitable manner. In the present instance they are formed in upper and lower halves which are provided with flanges 14 which receive bolts 15 for fastening the halves together. Each half may be formed in two parts also, such parts being provided with flanges 16 which are fastened together by rivets 17. Attached to the periphery of side plates 13 is a discharge ring 18 comprising two side members 19 and 20 fastened together by bolts 21, there being spacing collars 22 on the bolts to hold the members in spaced relation to each other. Discharge ring 18 is split on the horizontal plane of the axis of the machine as indicated at 23 in Fig. 2, thus dividing the ring into upper and lower halves. The upper halves of side plates 13 are attached to side rings 11 and 12 by stay plates 24 and by guide plates or partition plates 25. The stay plates and guide plates may be attached to side plates 13 and rings 11 and 12 in any suitable manner. In the present instance they are welded together. The lower halves of side plates 13 are attached to side rings 11 and 12 by the curved guide plates or partition plates 26 which form continuations of guide plates or partition plates 25. Plates 26 may be attached to rings 11 and 12 and side plates 13 by welding. The lower half of discharge ring 18 is attached to side rings 11 and 12 by suitable stay rods 27.

The casing parts so far described form a rigid structure which carries the bearings and which position side plates 13 with respect to the impeller wheel with which they have a close running clearance. Using this structure as a frame work, the remainder of the compressor casing is built up on it from suitable material such as sheet metal. The central openings in end rings 11 and 12 are closed by sheet metal disks 28 which are suitably attached to rings 11 and 12 as by being welded thereto. Attached to the peripheries of end rings 11 and 12 are sheet metal walls 29 which may be held in place by clamp rings 30 and bolts 31. These walls on one side of the casing have substantially straight side edges as indicated at 32 and terminate in straight end edges 33. Attached to the edges of walls 29 is an enclosing wall 34 which may be fastened in position by suitable angle irons 35. Walls 29 and 34 are split in the horizontal plane of the axis of the shaft and the halves are fastened together by means of angle irons as indicated at 36. Partition plate 25 extends up flush with end edges 33 being attached to walls 29 by angle irons 37. This defines for the compressor an inlet passage 38 and a discharge passage 39. The lower wall of the inlet passage is defined by curved partition wall 26 and a partition plate 40 which is attached to the upper edges of walls 26 by angle irons as indicated at 41, and to the walls 29 and 34 by angle iron as indicated at 41ª. Located in inlet opening 38 are curved side walls 42 and top and bottom walls 43 which define a part of the discharge scroll for discharge ring 18. The direction of rotation of the impeller is clockwise as viewed in Fig. 2 and the portion of the discharge scroll in inlet 38 increases in size gradually, as best shown in Fig. 1, from its left hand end where it is attached to wall 25 to its right hand end where it is attached to partition plate 40. The left hand end is the beginning of the scroll and its end is closed by wall 25. The right hand end communicates with an opening in plate 40 so that the air from this portion of the discharge scroll flows into the curved passage between walls 26 and 34 which passage forms the remainder of the discharge scroll, leading to discharge passage 39.

The fluid to be pumped enters through inlet 38 and flows around opposite sides of walls 42 to the eye of the impeller. The impeller receives fluid on both sides and discharges it at its periphery from whence the fluid flows through the discharge scroll to outlet 39. Suitable conduits may be connected to inlet 38 and outlet 39 for conveying fluid to and away from the compressor, suitable stiffening and attaching flanges in the form of angle irons 44 being fastened to the edges of the inlet and outlet openings.

It will be noted that the inlet and outlet for the compressor are located side by side on the same side of the compressor casing so that it is the initial portion of the discharge scroll which is located in inlet 38. By this arrangement we are enabled to make the sides of the compressor flat and still provide ample space in the inlet for conveying fluid to the eye of the impeller. We are thus enabled to avoid having to enlarge the compressor casing at the part where the discharge scroll extends through the inlet passage.

It will be noted also that the bearing brackets 8 are formed separately from rings 11 and 12 and are attached thereto by bolts which enter openings in such rings. By this arrangement the bearings may be bolted to the casing in a position to bring feet 9 into any desired relation to the inlet and outlet openings so that the compressor may be supported with the inlet and outlet openings facing in any desired direction.

In accordance with the provisions of the patent statutes, we have described the principle of operation of our invention together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. In a centrifugal compressor, the combination of side rings, bearings carried by said rings, a shaft supported in said bearings, an impeller on the shaft, side plates for the impeller attached to and carried by said side rings, a discharge ring carried by the side rings, and walls attached to the side rings and defining therewith an admission passage and a discharge scroll for the compressor.

2. In a centrifugal compressor, the combination of side rings, bearings carried by said rings, a shaft supported in said bearings, an impeller on the shaft, side plates for the impeller attached to and carried by said side rings, a discharge ring carried by the side rings, walls attached to the side rings and defining therewith an admission passage and a discharge scroll for the compressor, the exit opening for the discharge scroll being directly adjacent the admission passage.

In witness whereof, WILLIAM EVERETT VER PLANCK has hereunto set his hand this fourteenth day of April, 1924, and DUNCAN DANA has hereunto set his hand this tenth day of April, 1924.

WILLIAM EVERETT VER PLANCK.
DUNCAN DANA.